(12) United States Patent
Wand

(10) Patent No.: US 10,752,115 B2
(45) Date of Patent: Aug. 25, 2020

(54) CONTACTOR SUPPLY BUS

(71) Applicant: Ford Global Technologies, LLC, Dearborn, MI (US)

(72) Inventor: Thomas Joseph Wand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

(21) Appl. No.: 15/708,304

(22) Filed: Sep. 19, 2017

(65) Prior Publication Data

US 2019/0084424 A1    Mar. 21, 2019

(51) Int. Cl.
*B60L 3/00* (2019.01)
*B60L 50/51* (2019.01)
*H01H 9/56* (2006.01)
*H01H 47/00* (2006.01)
*H01H 47/32* (2006.01)

(52) U.S. Cl.
CPC ............. *B60L 3/0038* (2013.01); *B60L 50/51* (2019.02); *H01H 9/56* (2013.01); *B60L 2210/40* (2013.01); *H01H 47/002* (2013.01); *H01H 47/325* (2013.01)

(58) Field of Classification Search
CPC .......................... B60L 3/0038; B60L 11/1803; B60L 2210/40; H01H 9/56
See application file for complete search history.

(56) References Cited

U.S. PATENT DOCUMENTS

| 8,564,157 | B2 | 10/2013 | Nordstrom et al. |
| 2002/0167223 | A1* | 11/2002 | Yamazaki ............... B60L 58/10 307/9.1 |
| 2006/0000460 | A1* | 1/2006 | Masters ................ F02P 3/0456 123/609 |
| 2010/0066293 | A1* | 3/2010 | Iriguchi .................... H02P 1/04 318/478 |
| 2012/0251866 | A1* | 10/2012 | Matejek ................ B60L 3/0046 429/123 |
| 2014/0002021 | A1 | 1/2014 | Bertness |
| 2014/0002939 | A1* | 1/2014 | Grupido .................... B60L 3/04 361/91.1 |
| 2014/0141287 | A1 | 5/2014 | Bertucci et al. |
| 2014/0350791 | A1* | 11/2014 | Matsushita .......... B62D 5/0481 701/41 |
| 2014/0356686 | A1* | 12/2014 | Namou ............... H01M 10/425 429/121 |
| 2015/0276842 | A1* | 10/2015 | Chang ................ G01R 31/3644 324/503 |
| 2016/0272076 | A1* | 9/2016 | Fan ..................... B60L 11/1816 |

* cited by examiner

*Primary Examiner* — Jared Fureman
*Assistant Examiner* — Emmanuel Dominique
(74) *Attorney, Agent, or Firm* — Brooks Kushman PC; David Kelley

(57) ABSTRACT

A vehicle includes an inverter. The vehicle includes a contactor power bus configured to supply power to latching mechanisms of main and precharge contactors that are associated with the inverter. The vehicle includes a controller configured to maintain operation of the inverter and generate a sensor fault. The operation of the inverter may be maintained responsive to sensor output indicating that different portions of the contactor power bus are energized and deenergized.

12 Claims, 3 Drawing Sheets

CONTACTOR SUPPLY BUS

TECHNICAL FIELD

The present disclosure relates to contactor supply buses.

BACKGROUND

Vehicles may include contactors or switches for connecting and disconnecting energy sources to inverters. The contactors may be driven by a contactor supply bus. A controller may be configured to monitor the bus for deenergization. False positives related to deenergization may arise due to a single point of indication.

SUMMARY

A vehicle includes an inverter. The vehicle includes a contactor power bus configured to supply power to latching mechanisms of main and precharge contactors that are associated with the inverter. The vehicle includes a controller configured to maintain operation of the inverter and generate a sensor fault. The operation of the inverter may be maintained responsive to sensor output indicating that different portions of the contactor power bus are energized and deenergized. One of the portions may include a junction between the contactor power bus and the latching mechanism of the precharge contactor. Another of the portions may include a junction between the contactor power bus and the controller. Maintaining operation of the inverter may include operating a driver to supply the latching mechanisms of the main contactors with greater than half duty cycle. The duty cycle may be 100%. A Zener diode may be arranged with the driver to prevent over-voltage of a transistor of the driver responsive to the sensor output indicating that different portions of the contactor power bus are energized and deenergized.

A method includes, by a controller, maintaining operation of an inverter responsive to sensor output indicating that different portions of a contactor power bus, configured to supply power to latching mechanisms of main and precharge contactors that are associated with an inverter of a vehicle, are energized and deenergized. The method includes generating a sensor fault responsive to sensor output indicating that different portions of the contactor power bus are energized and deenergized.

A vehicle includes an load. The vehicle includes a contactor power bus configured to supply power to latching mechanisms of main and precharge contactors that are associated with the load. The vehicle includes a controller configured to maintain operation of the load and generate a sensor fault. The operation of the load is maintained responsive to sensor output indicating that a precharge latching mechanism portion and a contactor power bus junction of the contactor power bus are energized and deenergized, respectively.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern electric and hybrid vehicles include contactors to selectively energize vehicle loads. For example, a battery system may be configured to selectively energize an inverter or other load that operates an electric machine or traction motor. The inverter may be in parallel with a DC link capacitor. The DC link capacitor may be charged with a precharge contactor circuit before the main contactor circuit is engaged to reduce system shock.

The precharge contactor and main contactor may be operated by a latching mechanism or other implement that is energized through control of a contactor power bus. A sensor or input to a controller may be used to determine contactor power bus energization. The sensor or input may be an analog or digital input of the controller. Because of different power and use requirements, the precharge contactor driver may have different operation than the main contactor driver. The unique operation of the precharge contactor driver may allow a detection of the contactor power bus energization while it is not being used, which improves the robustness of the monitoring system by adding an additional—and previously unused—contactor power bus sensor location.

Figure 1:
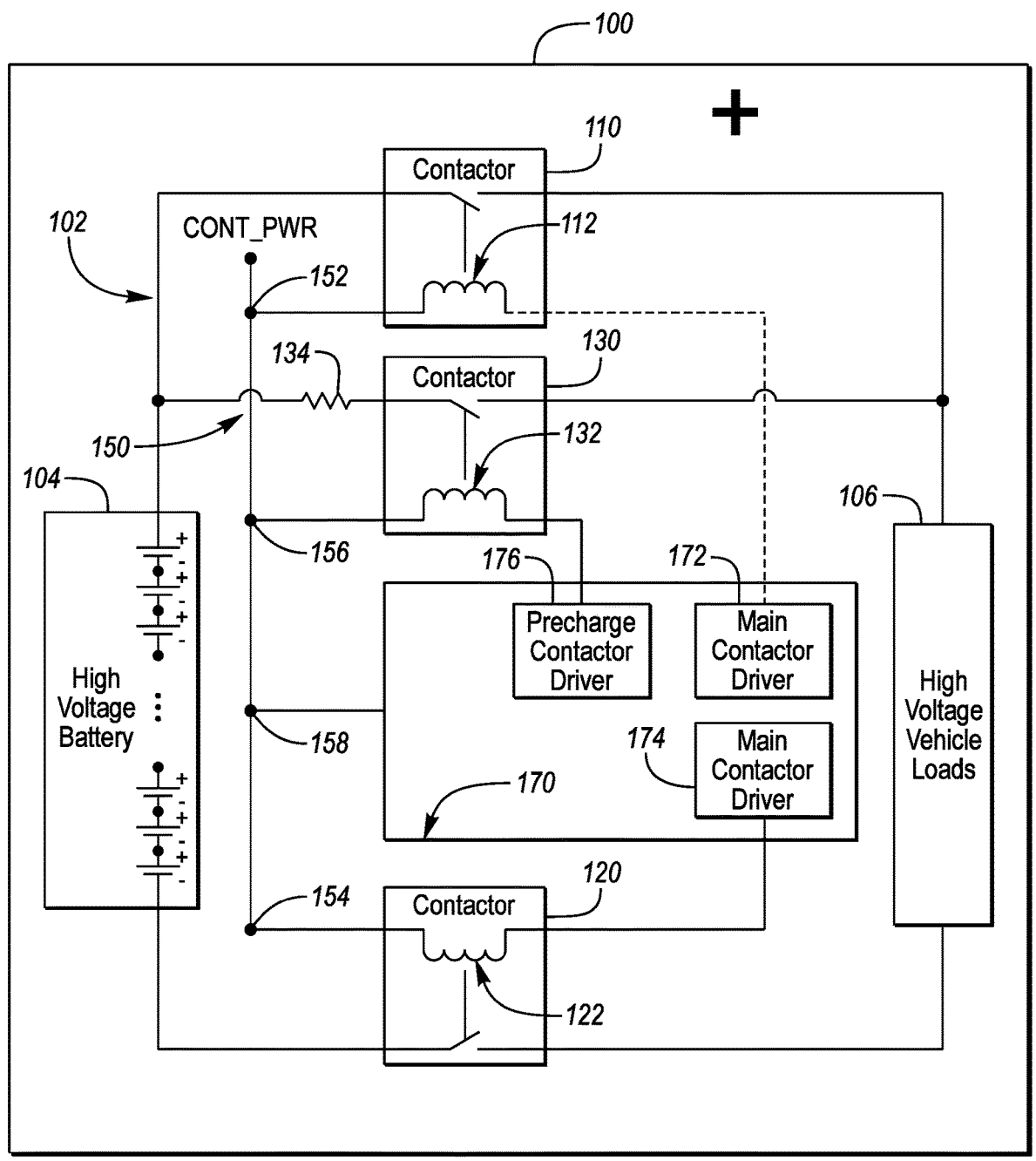
FIG. 1 is a schematic view of a vehicle including loads.

Referring to FIG. 1, a vehicle 100 is shown. The vehicle 100 includes an electricity supply system including a high-voltage battery 104 and high-voltage vehicle loads 106, which may include an inverter. As shown, the system includes two main contactors 110, 120 to selectively connect and disconnect the high-voltage vehicle loads 106 from power and ground. A precharge contactor 130 is configured to charge a DC link capacitor while limiting the current flowing from the batteries 104 to the load 106 until the DC link capacitor voltage is sufficiently similar to the battery 104 voltage.

Each of the contactors 110, 120, 130 include respective latching mechanisms 112, 122, 132 to operate the switch. Any type of latching mechanism 112, 122, 132 may be used. For example, a solenoid latching mechanism or other relay latching mechanisms may be used. In other embodiments, steady-state switches may be used. Any type of contactor, switch, or connection mechanism may be used to complete the circuit with the precharge loop and the main loop.

The latching mechanisms 112, 122, 132 are each driven independently by the controller 170 from drivers 172, 174, 176, respectively. Additional controllers or combinations of controllers may be used. The main contactor drivers 172, 174 may be configured differently from the precharge contactor driver 176. For example, the main contactor drivers 172, 174 may drive the respective latching mechanisms 112, 122 with a pulse width modulated (PWM) signal or other methods as explained further in FIG. 2. The precharge contactor driver 176 may operate the latching mechanism with direct current or other methods. Each of the contactors may form independent circuits with the contactor power bus 150.

The contactor power bus 150 may have junctions 152, 154, 156, 158 associated with each of the contactor drivers 172, 174, 176, each of the junctions 152, 154, 156, 158 corresponding to respective portions of the contactor power bus 150. The controller 170 may have a contactor power bus junction 158 that is directly or indirectly connected with an input to the controller 170. The controller 170 may determine power availability of the contactor power bus 150 through the controller junction 158. The precharge contactor driver 176 may have voltage detection circuitry detection innate to the direct actuation of the latching mechanism 132 to determine whether the precharge contactor power bus junction is energized.

Figure 2:
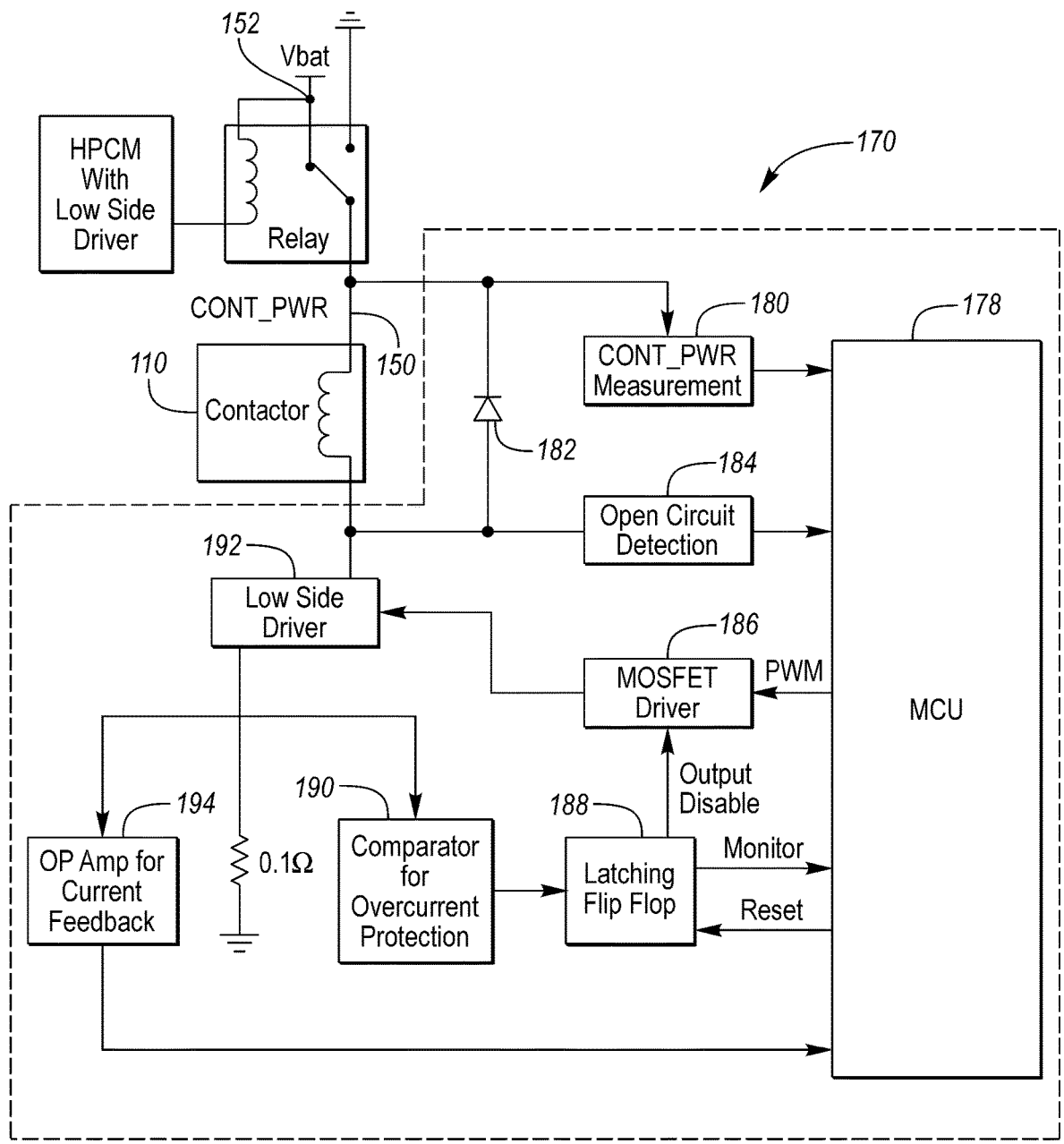
FIG. 2 is a schematic view of a controller configured to energize a contactor.

Referring to FIG. 2, the main contactors 110 are driven by PWM circuitry of the controller 170. The controller may include a control unit 178. The main control unit 178, as part of the controller 170, includes a contactor power bus measurement circuitry 180 to measure the voltage of the contactor power bus junction 158. A recirculation diode 182 may be in place to detect open-circuits along with open-circuit detection circuitry 184.

The control unit 178 also provides the MOSFET driver 186 and low-side driver 192 with a PWM signal to operate the contactor 110. A protection circuit includes a latching flip-flop 188, a comparator for overcurrent protection 190, and a feedback monitor circuit that may include an operational amplifier 194 for current feedback. The protection circuit is capable of disabling the low side driver MOSFET 192. A battery, Vbat 152, is used to power the contactor power circuit 150. A relay, may be used to connect and disconnect Vbat 152 from the contactor power bus 150.

Figure 3:
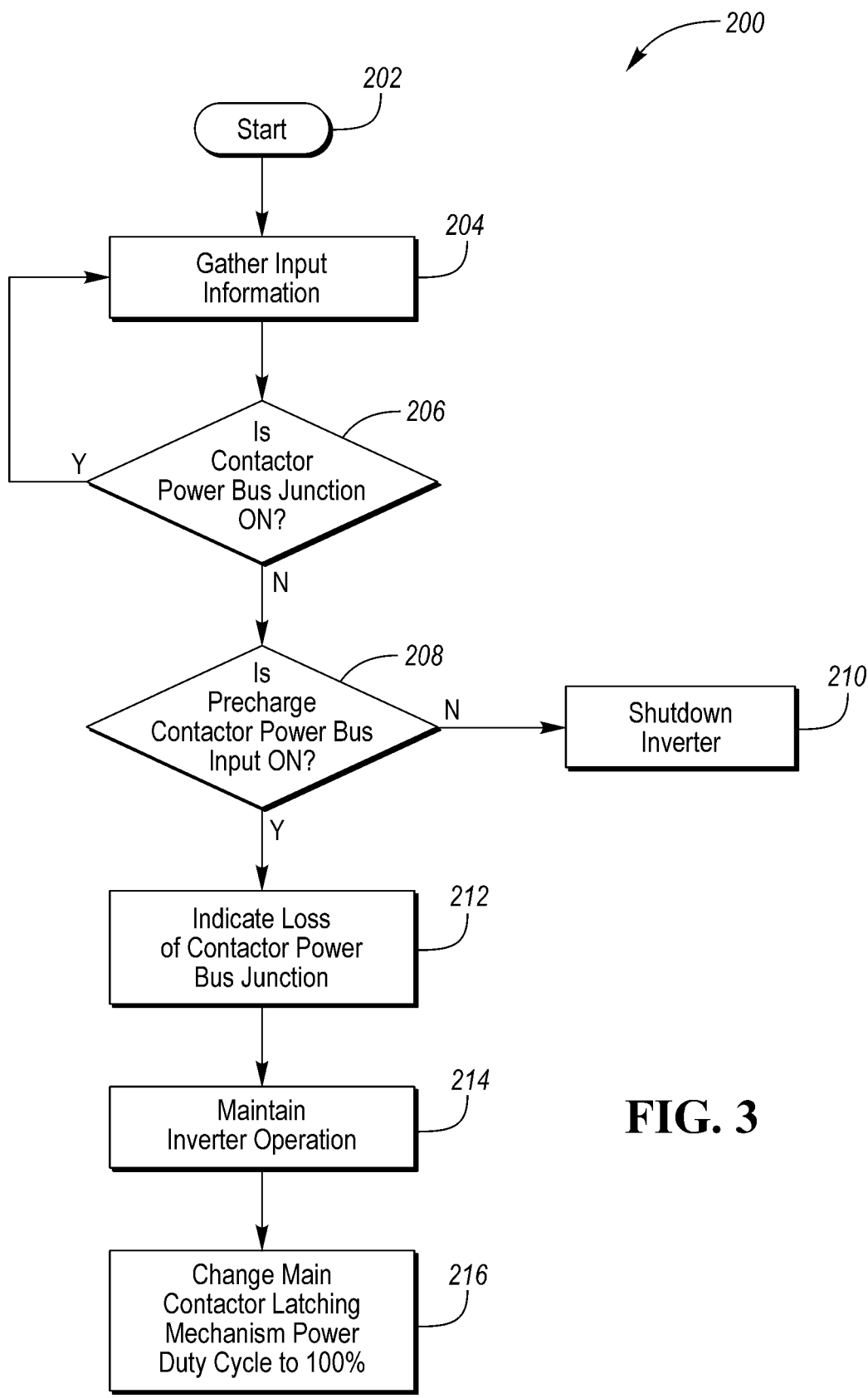
FIG. 3 is an algorithm for detecting a loss of power to a bus.

Referring to FIG. 3, an algorithm 200 is shown. The algorithm begins in step 202. In step 204, input information is gathered. The information gathered may be contactor power bus junction voltage levels or other information used to determine whether particular portions of the contactor power bus 150 is energized.

In step 206, the controller 170 may determine whether voltage or power is present at the contactor power bus junction 158. The controller 170 may wait for indication that the power bus junction 158 is deenergized. If the contactor power bus junction 158 is deenergized, the controller 170 may determine whether the precharge contactor power bus junction 156 has power. The precharge contactor power bus junction 156 may be fed to the precharge contactor driver 176. The precharge contactor driver may include innate circuitry that senses the presence of voltage on the contactor power bus 150 and precharge contactor power bus junction 156. For example, a preexisting input may be necessary for the precharge contactor driver 176. The preexisting precharge contactor driver circuit 176 may be repurposed to detect whether power is available at the precharge contactor junction 156. If both indications and portions, the contactor power bus junction 158 and the precharge contactor power bus junction 156, are deenergized, the controller 170 may shut down the inverter. The controller 170 may shut down the inverter by opening the main contactors 110, 120, or deenergizing the respective latching mechanisms 112, 122.

If the precharge contactor power bus junction 156 is still energized, the controller 170 will maintain inverter operation by augmenting the control of the main contactor latching mechanisms 112, 122. The latching mechanisms 112, 122 may be energized by a greater than 50% duty cycle. The latching mechanisms 112, 122 may be energized by a 100% duty cycle. The duty cycle change may be necessitated by the main contactor driver circuit discussed in FIG. 2 because normally the recirculation diode 182 clamps the latching mechanism 112, 122 voltage. When the recirculation diode 182 is non-conducting, however, it cannot clamp the voltage. In such a case, a Zener protection circuit within the MOSFET driver 186 will begin to clamp driver voltage. The controller 170 may also generate an indication of a fault to an onboard diagnostics system. The onboard diagnostics system may display the fault to a vehicle 100 operator. For example, if the contactor power bus 150 the Zener diode will clamp the voltage. Also then at the instant this connection is broken, the contactors are latched off by the controller 170 to protect the system from any potential reconnection by the controller 170. Meaning, the duplicative use of the precharge contactor driver 176 aids to keep the system and vehicle in operation by recognizing that only the contactor bus junction 158 is deenergized, which adds sensory redundancy to the system without the additional of chips or parts The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a traction battery selectively couplable to a vehicle high-voltage bus;
    an inverter;
    a precharge contactor having an associated precharge latching mechanism powered by a first portion of a contactor power bus, the precharge contactor configured to selectively couple a DC link capacitor to the vehicle high-voltage bus;
    a main contactor configured to selectively couple the traction battery to the inverter and having an associated main latching mechanism powered by a second portion of the contactor power bus;
    and
    a controller configured to supply power to the main latching mechanism to maintain operation of the inverter in response to sensor output indicating that one of the first and second portions of the contactor power bus is energized and another of the first and second portions of the contactor power bus is deenergized.

2. The vehicle of claim 1, wherein one of the first and second portions includes a junction between the contactor power bus and the precharge latching mechanism of the precharge contactor.

3. The vehicle of claim 2, wherein another one of the first and second portions includes a junction between the contactor power bus and the controller.

4. The vehicle of claim 1, wherein supplying power to the main latching mechanism includes operating a driver to supply the main latching mechanism with greater than half duty cycle.

5. The vehicle of claim 4, wherein the greater than half duty cycle is 100%.

6. The vehicle of claim 4 further comprising a Zener diode arranged with the driver to prevent over-voltage of a transistor of the driver responsive to the sensor output.

7. A method comprising:
by a controller, maintaining operation of an inverter responsive to sensor output indicating that different portions of a contactor power bus, configured to supply power to latching mechanisms of main and precharge contactors that are associated with an inverter of a vehicle, are energized and deenergized, respectively; and
generating a sensor fault responsive to sensor output indicating that the different portions of the contactor power bus are respectively energized and deenergized.

8. The method of claim 7, wherein one of the portions includes a junction between the contactor power bus and the latching mechanism of the precharge contactor.

9. The method of claim 7, wherein another of the portions includes a junction between the contactor power bus and the controller.

10. The method of claim 7, wherein maintaining operation includes operating a driver to supply the latching mechanisms of the main contactors with greater than half duty cycle.

11. The method of claim 10, wherein the greater than half duty cycle is 100%.

12. The method of claim 10 further comprising a Zener diode arranged with the driver to prevent over-voltage of a transistor of the driver responsive to the sensor output indicating that different portions of the contactor power bus are energized and deenergized.

* * * * *